United States Patent
Ting

(10) Patent No.: US 7,941,849 B2
(45) Date of Patent: May 10, 2011

(54) SYSTEM AND METHOD FOR AUDIT TRACKING

(75) Inventor: David M. T. Ting, Sudbury, MA (US)

(73) Assignee: Imprivata, Inc., Lexington, MA (US)

( * ) Notice: Subject to any disclaimer, the term of this patent is extended or adjusted under 35 U.S.C. 154(b) by 1246 days.

(21) Appl. No.: 10/395,034

(22) Filed: Mar. 21, 2003

(65) Prior Publication Data

US 2004/0186882 A1   Sep. 23, 2004

(51) Int. Cl.
G06F 15/16 (2006.01)
(52) U.S. Cl. .......................................... 726/22
(58) Field of Classification Search ............ 726/22
See application file for complete search history.

(56) References Cited

U.S. PATENT DOCUMENTS

| | | | |
|---|---|---|---|
| 5,857,028 A | 1/1999 | Frieling | 382/116 |
| 5,978,373 A * | 11/1999 | Hoff et al. | 370/392 |
| 6,311,272 B1 * | 10/2001 | Gressel | 713/186 |
| 6,460,141 B1 * | 10/2002 | Olden | 726/4 |
| 6,651,175 B1 * | 11/2003 | Slama | 726/30 |
| 6,990,588 B1 * | 1/2006 | Yasukura | 713/186 |
| 7,047,419 B2 * | 5/2006 | Black | 713/186 |
| 7,062,540 B2 * | 6/2006 | Reddy et al. | 709/217 |
| 2001/0036299 A1 | 11/2001 | Senior | 382/124 |
| 2002/0161766 A1 * | 10/2002 | Lawson et al. | 707/9 |
| 2003/0046135 A1 * | 3/2003 | Cartwright et al. | 705/8 |
| 2003/0051161 A1 * | 3/2003 | Smith et al. | 713/201 |
| 2003/0084288 A1 * | 5/2003 | de Jong et al. | 713/168 |
| 2003/0120934 A1 * | 6/2003 | Ortiz | 713/186 |
| 2003/0140120 A1 * | 7/2003 | Hartman | 709/219 |

FOREIGN PATENT DOCUMENTS

WO   98/16906   4/1998
WO   01/27723 A1   4/2001

OTHER PUBLICATIONS

International Search Report PCT/US 02/15469 dated Mar. 3, 2004.
International Search Report PCT/US 02/15466 dated Mar. 15, 2004.

* cited by examiner

*Primary Examiner* — Benjamin E Lanier
*Assistant Examiner* — Devin Almeida

(57) ABSTRACT

User activities in various applications are audited using a client-resident agent. An alias for an individual is associated with a user profile for the individual user. The user profile may contain data pertaining to the user's activities within one or more applications. Data in the user profile may be used to determine which actions are audited, and how the audit data is used.

15 Claims, 4 Drawing Sheets

SYSTEM AND METHOD FOR AUDIT TRACKING

FIELD OF INVENTION

The invention relates generally to auditing the usage of a computer system. More specifically, in one embodiment, the invention relates to systems and methods for using a client resident agent to audit a user's usage of a computer system.

BACKGROUND

The number of computer applications used by large corporations has increased significantly over the past twenty years. For example, companies may employ separate applications for electronic mail, document control, financial applications, inventory management, manufacturing control and engineering functions, in addition to overall network access. Each application may, include numerous modules and screens, each with one or more functions. Due to numerous regulatory and business requirements, maintaining records of use of computer systems by multiple users, each with varying access privileges and functional capabilities, many applications include auditing features that track an individual's use of that application. However, each application often requires a separate administrative function to define, store, and distribute user privileges and monitor the audit logs associated with the users.

From a management perspective, it is very cumbersome to capture and extract meaningful information about one particular user's activities across audit logs from multiple systems on an application by application basis. Indeed, on some legacy applications, it not even possible to capture such data without rewriting the application. Furthermore, the need to implement processes for each new application added by an organization is often repetitive of processes already in place for other applications. The user faces similar challenges in tracking activities across multiple web sites or applications, particularly when only a subset of the actions are of interest. For example, a user may be interested in all the financial transactions processed at multiple financial web sites, but not in tracking the downloading of content or balance inquiries. Indeed, the multitude of computer applications a user interacts with on a daily basis makes it both cumbersome and expensive to accurately track activity, and extract relevant data from the audit logs.

SUMMARY OF THE INVENTION

The present invention automates the auditing of user activities across multiple server-based (e.g., web-based) applications. In response to a user launching or performing a function in an application, or navigating to a particular web page, the invention creates records, on the client machine, of the activities performed. These records may be transmitted back to the server. In this way, a complete record of a user's activities across multiple applications is created. The functionality implementing the auditing is preferably resident on the user's client computer.

Accordingly, in a first aspect, the invention comprises a method for creating and maintaining audit logs of a user's activities on a computer. The method comprises identifying the user to a server, monitoring the user's activities on a client computer, and sending records of the monitored activity back to the server. In one embodiment of the invention, the records are stored in a user profile, which is sent to the server. The user profile stored on the server can include a reference set of biometric data associated with the user. The user may input biometric data to the client, which transmits the biometric data to the server where it is compared to the reference set of biometric data. The user's identification is authenticated if the two sets of data match sufficiently.

The monitored user actions can include entry of items into the client by means of one or more input devices, and may be based on a set of screens presented to the user. The set of screens can include numerous fields, and the actions can include entering data into some or all of the fields, and transmitting the data to an application.

In a second aspect, the invention comprises a system for tracking and storing, on a client computer, a record of user activities in computer applications. The system includes a user profile that contains information related to the computer applications, a client-resident active agent that monitors the user's actions in the computer applications, and a communications module for sending the data captured by the client-resident agent to a server. Alternatively or in addition, the active agent may reside on an application server, where it monitors the user's actions in the computer applications.

In one particular embodiment, the system can also include a server computer for storing the user profile, and in some cases transmitting the user profile to a client machine. As an example, the data that can be stored in the user profile may include a password, user identification number, secure ID, or biometric data, and can be used to identify a user of the system. The system may further include a biometric input device whereby a user may, for example, present a fingerprint, retinal scan, or other biometric data to be sent to the server for authentication. In addition, the system may include a server to compare the biometric data received from the client machine to a set of reference biometric data stored on the server, and if the received data sufficiently matches the reference data, allow access to one or more computer systems.

In another embodiment, the active agent can monitor items entered or actions performed by the user employing one or more input devices connected to the client to perform functions within an application. For example, the agent may monitor a user's actions by recognizing the screens presented to the user, and further may recognize individual fields that make up a particular screen. In some cases, the agent may recognize particular fields, and use the data in the user profile to automatically complete one or more of the fields, thereupon causing the data to be transmitted back to the application.

In a third aspect, the invention comprises a system for monitoring a predetermined set of user actions performed on client computer and transmitted the data to a server computer. The system may include a first server for storing a user profile including a predetermined set of user actions, and transmitting the user profile to a client computer. The system also includes a second server for storing a reference set of biometric data and comparing biometric data received from a client computer to the stored reference set of biometric data. If the received set of biometric data sufficiently matches the stored set of biometric data, the server sends the user profile to the client computer.

Other aspects and advantages of the invention will become apparent from the following drawings, detailed description, and claims, all of which illustrate the principles of the invention, by way of example only.

BRIEF DESCRIPTION OF THE DRAWINGS

The above and further advantages of the invention may be better understood by referring to the following description taken in conjunction with the accompanying drawings, in which.

DETAILED DESCRIPTION

Figure 1:
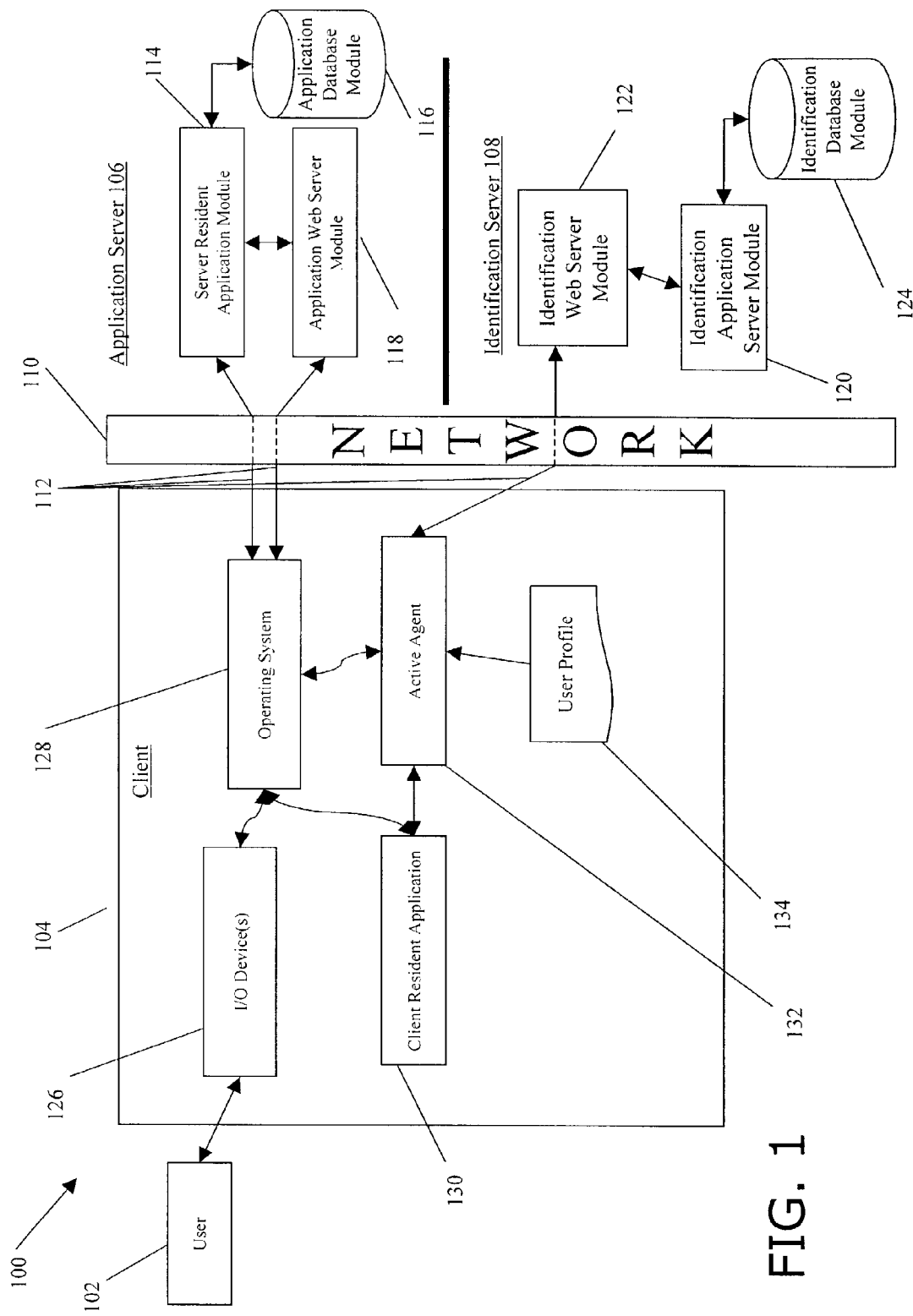
FIG. 1 is a block diagram of a system to authenticate a user and automate login to one or more applications using a client-resident user profile and an identification server in accordance with the invention.

In broad overview, FIG. 1 illustrates an embodiment of a system 100 to automate the login process to and to audit the user's activity within one or more applications in accordance with the invention. The system 100 includes a first computing system (a "client") 104, a second computing system (an "application server") 106, and a third computing system (an "identification server") 108, all in communication with a network 110. The client node 104 is used by one or more users, indicated graphically at 102. The client node 104, the application server 106 and the identification server 108 are in communication with the network 110 using communication channels 112.

For example, the communication channels 112 can connect the client 104 to a local-area network (LAN), such as a company Intranet, a wide area network (WAN) such as the Internet, or the like. The client 104 and servers 106, 108 communicate with the network 110 through the communication channels 112 using any of a variety of connections including, for example, standard telephone lines, LAN or WAN links (e.g., T1, T3, 56 kb, X.25), broadband connections (ISDN, Frame Relay, ATM), wireless connections, and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 104 and the servers 106, 108 encrypt all communication when communicating with each other.

Each of the servers 106, 108 can be any computing device capable of providing the services requested by the client 104. Particularly, this includes logging into secure applications, tracking user activities within applications, and terminating a user's access to applications as described in more detail below.

The application server 106 includes one or more server-resident application modules 114 and one or more application database modules 116. The application server 106 may also include an application web server module 118 to facilitate communication with the client 104 over the network 110 where the communication network 110 is the Internet, an intranet, or the like. The identification server 108 includes an identification application server module 120, an identification web server module 122, and an identification database module 124. The modules throughout the specification can be implemented in whole or in part as a software program and/or a hardware device (e.g., ASIC, FPGA, processor, memory, storage and the like).

For purposes of illustration, FIG. 1 depicts an application server 106 as an entity separate and distinct from the identification server 108 and each server in independent communication with the network 110. It is to be understood, however, that the servers 106, 108 can also be implemented, for example, on a single server (e.g., as logically distinct modules), distributed on portions of several (i.e., more than two) servers, and/or as part of a single server node or server farm in communication with the network 110 through, for example, a single web server (not shown). It should further be understood that even if two logical servers are running in the same physical machine, they may be secured logically if any of the following conditions are met: (1) the servers run in different process spaces (so there is no possibility for one process to access the memory of another process); (2) the servers access different logical databases (which may be further partitioned) with different credential or entry requirements; (3) sensitive data in the application server 106 and the identification server 108 are encrypted using separate encryption keys; or (4) the server applications are launched (e.g., in a Unix environment) under two different logon accounts. For heightened security, it is possible to encrypt all the data used by the identification server 108 using a key maintained by the application server 106 or an external key server. This approach enhances security because a breach of the of the identification server 108 and its database 124 would yield only encrypted data.

The client 104 can be any computing device (e.g., a personal computer, set top box, wireless mobile phone, handheld device, personal digital assistant, kiosk, etc) used to provide a user interface to access the application server 106. The client 104 includes one or more input/output devices 126 such as a keyboard, a mouse, a screen, a touch-pad, a biometric input device, and the like. The client 104 also includes an operating system 128. Operating systems supported by the client 104 can include any member of the WINDOWS family of operating systems from Microsoft Corporation. The client 104 may also include one or more client-resident applications 130, such as INTERNET EXPLORER developed by Microsoft Corporation, NETSCAPE NAVIGATOR developed by AOL Time Warner, or ATTACHMATE developed by Attachmate Corporation.

To use the system 100, a user 102 registers that user's authentication data for one or more applications with the application server 106. The authentication data can include, for example, a password, a user identification number, or biometric data associated with the individual's fingerprint(s), facial characteristics, voice, and the like. (It should be understood authentication using biometric indicia, while preferred, is by no means essential. Instead, authentication may occur by other conventional means, e.g., strong passwords or tokens.)

The system 100 stores authentication data identifying the user to the system (e.g., username, logon ID, employee ID and the like) in the application database module 116. The application database module 116 may also associate an alias with that stored data. For example, employee #2054 may be associated with the alias 719jLL01. As the user logs into an application 114 (residing on the application server 106) via the network 110, an active agent 132 residing on the client 104 captures the authentication data entered by the user 102 using one or more input devices 126 and transmits (or causes the transmission of) the authentication data to the identification web server module 122 residing on the identification server 108. The active agent 132 captures the data by, for example, monitoring a messaging queue for instructions sent to and from the operating system, intercepting HTTP requests sent to and from the network 110, capturing screen images sent to the output device(s) 126, as well as other methods. The identification web server module 122 provides the authentication data to the application server module 120, which in turn stores the data in the database module 124. The identification application server module 120 then retrieves the updated authentication data and sends it to the client 104 using the web server module 122 and the active agent 132. The authentication data is stored on the client 104 in the user profile 134 for future use by the active agent 132 residing on the client 104. Thereafter, as the user logs into an application in the usual fashion, the active agent 132 operates in the background, gathering and transmitting to the identification server 108 all the information necessary to automate subsequent logins.

Alternatively, or in addition, the active agent 132 may reside on a server. This embodiment is particularly useful in a "thin-client" environment, such as CITRIX METAFRAME. In this embodiment, a user 102 connects to a server where the active agent 132 resides. This server, in turn, communicates with the application server 106 and identification server 108. The displayed output (such as HTML or screen dumps, for example) is obtained indirectly from the application server 106, by way of the server on which the active agent 132 resides; that is, this additional server runs the active agent 132 and passes back the display information (as pixel values, markup code, or any other suitable display modality) to the client 104.

The user profile 134 can contain various data furthering the function of the invention, such as: a user identification code; an authentication modality (such as password, biometric data, or the like); an application profile (such as a user's rights and privileges within an application); an application credential for access (such as a user's password, a digital representation of biometric data, or the like); and audit records of a user's activities within an application. The active agent 132 can then use the data stored in the user profile 134 to determine which HTTP requests to intercept, to complete login screens with stored authentication data, and the like.

In the illustrated embodiment, there are security measures that the system 100 can use to ensure that a listening device does not capture this authentication data, or if the data is captured, that it is not usable by itself. For example, the active agent 132 can encrypt the alias and the biometric data independently; the active agent 132 and the identification database 124 can communicate with each other using SSL and/or public and private keys; and/or the active agent 132 can transmit the alias and the authentication data independently to the identification database 124.

The registration process can be initiated in several different ways. The responsible technology administrator may initiate the registration. For example, the administrator can have the user come to the administrator's client 104 or a secure client 104 used only for registration when the employee starts work, when a customer purchases services accessible via the application server 106, and the like. Alternatively, the application server 106 can initiate registration when the user first requests a service from the application server 106 requiring user authentication. The client 104 can display a graphical user interface ("GUI") leading the user through the registration process. The level of authentication of the user at registration may be selected by the administrators of the system 100 and can range, for example, from a user presenting the correct password to the application server 106 to a user being present in person in front of an administrator who can check the identification of the user.

Once the system 100 registers an individual, the identification application server module 120 creates an association between the data identifying the user to the identification system and the user's alias in the application database 116, and another association between the user's alias and the user's authentication data in the identification database module 124. Storing the two associations at locations separate from each other requires a breach in security of both the application database 116 and the identification database 124 to put authentication data together with some identifying data. For example, the first association may be stored in the application database module 116 residing on one physical server, while the second association may be stored in the identification database module 124, residing on a second physical server. Further, if the identifying data is just another unique identifier that does not reveal identity by itself, for example an employee number, then the security of a third database (not shown) containing the association between the employee number and the identity (e.g., name and address of the employee) would have to be breached to match the identity of the user with that individual's biometric data.

Figure 2:
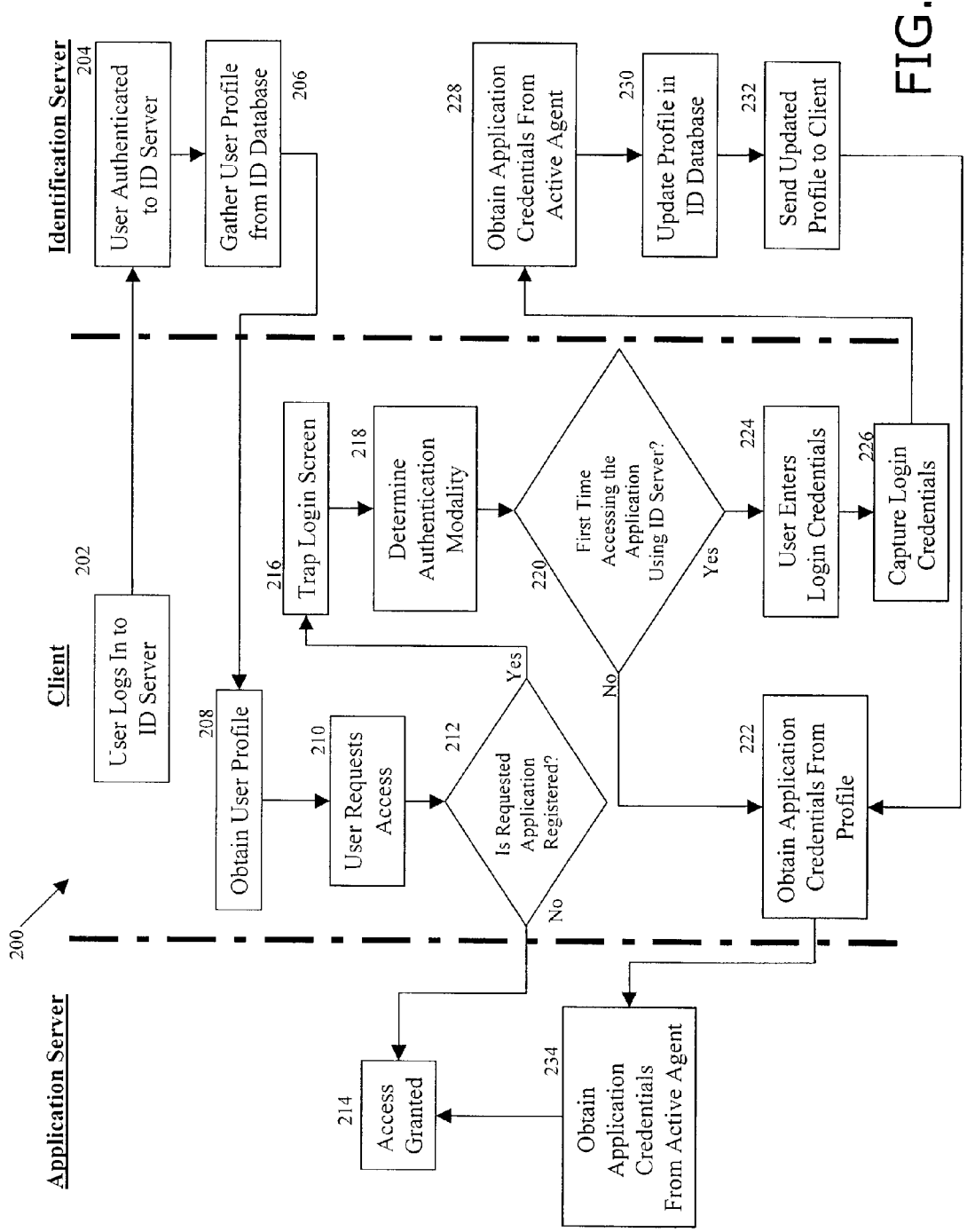
FIG. 2 is a flow diagram of a process to authenticate a user to one or more applications using a client-resident profile and an identification server in accordance with the invention.

With an individual registered in the identification server 108 (i.e., with user-identifying information, an alias, and authentication information obtained and stored in the identification database module 124), a process 200 as shown in FIG. 2 may be used to authenticate a user to one or more applications without the user having to provide authentication information for the application(s) each time the user requests access. The user 102 of the client 104 logs into the identification server 108 (step 202) by providing one or more of a password, user identification code, biometric data, or the like. The identification server 108 authenticates the user (step 204) and retrieves the user profile 134 associated with the user 102 from the identification database module 124 (step 206). The identification server 108 sends the user profile 134 to the client 104 (step 208) for future use by the active agent 132.

In one version of the above-described embodiment, the user profile 134 remains on the client 104 after the user 102 terminates each session. In this case, the user profile 134 that is sent from the identification server 108 automatically overwrites the user profile 134 from the previous session. More preferably, however, the user profile 134 is deleted upon termination of each session for security purposes. In either case, once the update data arrives from the identification server 108 and is stored in the user profile 143 on the client 104, the active agent 132 uses the data contained in the user profile 134 to automatically register the user 102 with the application 114 without the user needing to perform any authentication procedures.

The application server 106 provides access to a service (e.g., execution of an application program, access to a financial or medical database, access to an electronic vault with which the user is associated, download of data and/or application program, and the like). As illustrated in the present embodiment, the user of an application requests access to the application by navigating to a login page or to an access screen for the application (step 210). The active agent 132 recognizes the user action as a request to access an application and determines if the application is a restricted access application (decision step 212). If the active agent 132 determines that, based on the data stored user profile 134 and described in detail above, the application is not restricted, access is granted (step 214).

Alternatively, if the active agent 132 determines that the requested application is a restricted access application, the active agent 132 traps the login or access screen (step 216). The login or access screen may be trapped by, for example, querying an operating system message queue, initiating random screen captures, attaching an object to an Internet browser to intercept HTTP messages, connecting to a terminal emulator using the HLLAPI protocol, and recognition of HTTP addresses, among other methods. In conjunction with trapping the login screen, the active agent 132 queries the user profile 134 to determine the authentication modality used to gain access to the application (step 218). The active agent 132 further determines whether the user 102 has previously accessed the application being requested (decision step 220). If in one instance, the user 102 has previously accessed the application being requested, the active agent 132 obtains the application credentials (step 222) from the user profile 134, completes the login form or access screen, and transmits (step 234) the credentials to the application server 106. The application server 106 may then grant the user access to the application (step 214). The active agent 132 may additionally generate a unique session code to use in tracking subsequent activity, which may be later included as part of audit records.

For example, in the case of a web application, the active agent 132 may recognize, based on an entry in the user profile 134, an HTTP address entered by the user into the location field of a client-resident Internet browser application. If, for example, the resulting web page includes form fields requiring user authentication, the active agent 132 queries the user profile 134 for the data records corresponding to that address, which include the data necessary to complete the form. Recognizing the data as corresponding to the requested web page, the active agent 132 automatically completes the form and sends the data to the application server 106. Thus, the user gains access to the application without having to enter her authentication information and can perform the desired functions within the application.

Alternatively, for network-based applications accessed via application server 106, the active agent 132 monitors the operating system message queue, recognizing messages corresponding to the requested application (based on entries in the user profile 134) and taking appropriate action (also as specified entries in the user profile 134), e.g., logging the user in or, as described below, enforcing restrictions.

In another instance of the current example, a user 102 may be requesting access to an application for the first time. In such a case, the identification server 108 may not have the correct authentication credentials for the user 102, and therefore the active agent 132 will not be able to complete the login screen. Therefore, the user 102 manually enters her authentication credentials (step 224) using one or more input devices 126. Using one or more of the methods described above, the active agent 132 captures the authentication credentials (step 226), and if the login is successful, sends the information to the identification server 108. The identification server 108 receives the authentication credentials for the newly requested application (step 228), and sends them to the identification database module 124. The identification server 108 then updates the user profile (step 230) in the identification database module 124, and sends the updated user profile 134 back to the client 104. The active agent 132 then obtains the application credentials (step 222) from the updated user profile 134, completes the login form or access screen, and transmits (step 234) the credentials to the application server 106. The application server 106 may then grant the user access to the application (step 214).

In some circumstances, the login process may not be successful. This may be due to a user manually changing his application password, a password expiring, an administrator resetting the password, or other application specific event. In such cases, the active agent 132 recognizes the screens or messages representing an unsuccessful login sent from the application server 106 to the client 104. The application 106 can then send screens to the client 104 instructing the user 102 to reset his password, PIN, or other authentication data. The active agent 132 captures the reset process, updates the user profile 134 with the new data, and sends the new password to the identification server 108 where it is stored in the database module 124. The identification server 108 can then send the user profile 134 back to the client 104 for use during the current and/or future sessions. In some versions, the active agent 132 can also automatically generate a random password for the user 102 such that the user 102 is unaware of the password-reset process.

Figure 3:
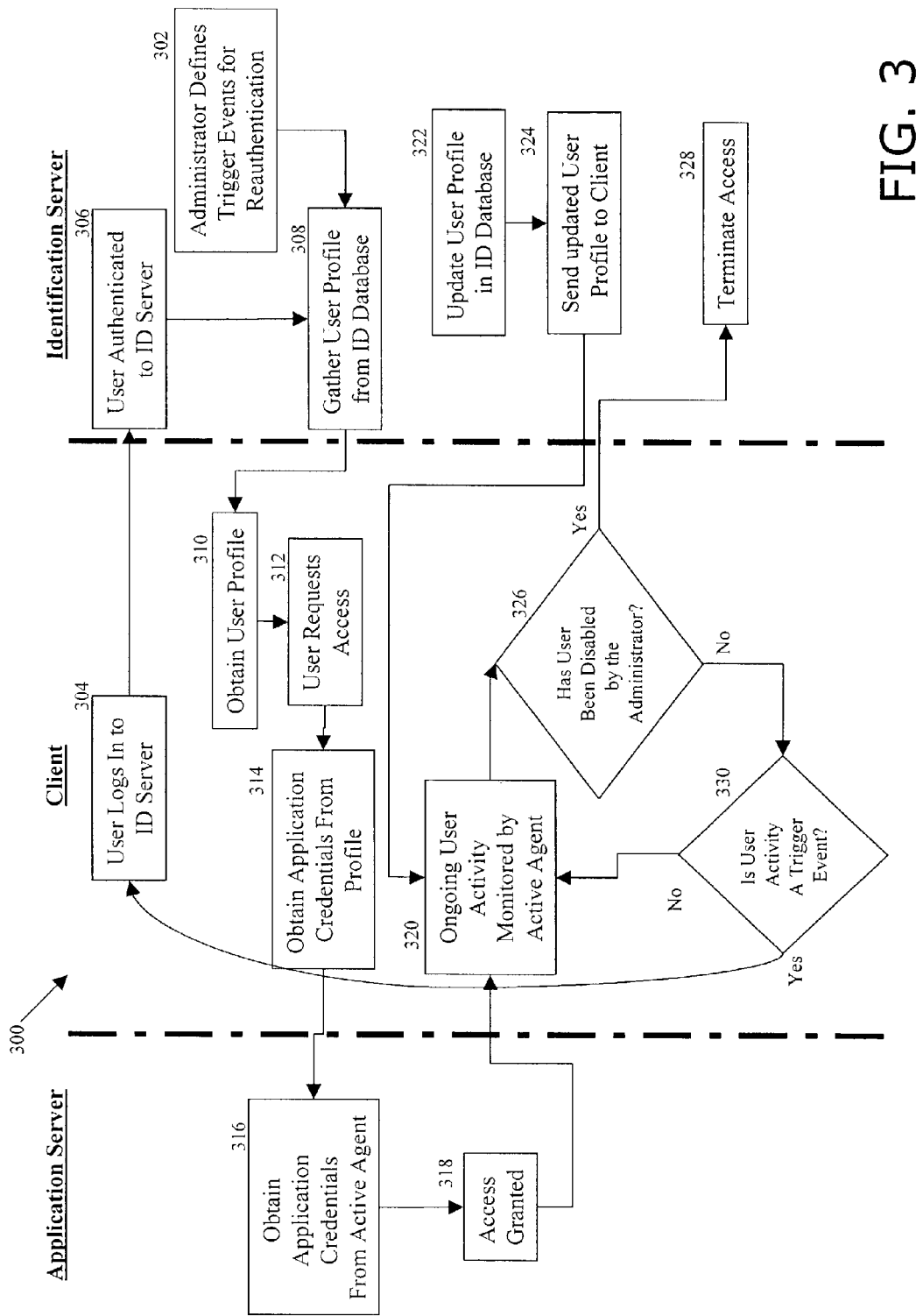
FIG. 3 is a flow diagram of a process to disable a user from one or more applications and define events that require a user to re-authenticate themselves using a client-resident profile and an identification server in accordance with the invention.

With an individual registered in the identification server 108 (i.e., with user-identifying information, an alias, and authentication information obtained and stored), a process 300 as shown in FIG. 3 may be used to automatically withdraw a user's access rights to an application and to define events that require a user to be re-authenticated. Prior to a user 102 being logged into the identification server 108, an administrator may define trigger events (step 302) which, when recognized by the active agent 132, may terminate access, or require re-authentication, to the identification server 108. A trigger event can be a particular function or screen accessed by a user, a broken communications link, inactivity of the user, a signal from the server sent on a periodic or random basis, expiration of an application password, or the like. Furthermore, trigger events can be set globally for all users and all applications, for individual users across all registered applications, for particular applications, for certain modules within applications, or for entries in selected fields on particular screens. The trigger events can be stored in the identification database module 124 as part of a user profile 134. When a user 102 logs into the identification server 108 (step 304), his authentication credentials are authenticated (step 306) by the identification server 108. The identification server 108 queries the identification database module 124 and gathers the data necessary to construct the user profile (step 308). The active agent 132 residing on the client obtains the user profile data from the identification server 108 and stores the user profile on the client 104 (step 310).

Continuing with the example above, a user 102 requests access (step 312) to an application server 106. The active agent 132 retrieves the authentication credentials (step 314) from the user profile 134 residing on the client 104, and transmits the credentials to the application server 106. The application server 106 receives the application credentials (step 316) from the client 104, and grants the user 102 access to the requested application (step 318). Once granted access to the application server 106, the user 102 may execute functions (step 320) within the application based on the data stored in his user profile 134.

Data specifying these restrictions is stored in the user profile 134, and once again, the active agent 132 constantly monitors the user's activities (by trapping screens, fields within a screen, etc.) and permits execution of only these actions consistent with the restrictions.

For example, a first user 102 may be restricted to view only particular screens within an application, may only have read access to data on particular screens, may only be able to update a single field on a screen, or may be blocked from viewing certain web pages within a permitted web site. Conversely, a second user (not shown) may have full administrative rights to an application, and/or may have rights to view any or all web pages within a particular web site. Therefore, the active agent 132 may restrict the first user's actions based on the information in her user profile (preventing transmission of "save" commands in conjunction with read-only data or requests for disallowed web pages), while the second user may have no restrictions on the functions she may perform, or data she can enter and update based on the data in her user profile.

In one particular version, the invention permits an administrator to revoke a user's access to one or more applications 114 registered with the identification server 108, even in the case where the user 102 is currently logged into the application(s). Referring again to FIG. 3, the active agent 132 may constantly monitor the ongoing user activity (step 320) for activities corresponding to entries in the user profile 134 currently residing on the client 104. An administrator may then update one or more user profiles 134 (step 322) with instructions that the user's access rights are to be revoked. The updated user profile may then be sent (step 324) to the client 104 for use by the active agent 132 as it monitors ongoing user activity, overwriting the previous user profile 134. If the active agent 132 receives notice the user's access rights have been revoked (decision step 328), the active agent traps the user activity and terminates access (step 326) to the identified application(s) 106.

A user 102 may also be required to re-authenticate himself to the identification server 108 based on one or more trigger events. A re-authentication trigger event may be, for purposes of illustration, a particular function initiated by a user or an administrator, a broken communication link, a screen or web page requested by a user, inactivity of the user, passage of some period of time, revocation of access rights, the execution of a particular sequence of functions, elapsed time within an application, the receipt of web content, or a signal from the server sent on a periodic or random basis. The trigger events can be stored in the identification database module 124 as part of a user profile 134, and are sent to the client 104 when a user 102 logs into the identification server 108. As the user 102 performs ongoing activities within applications, the active agent 132 can determine if the user's access privileges have been revoked (decision step 328). If a user's access privileges have not been revoked, the active agent 132 can then determine if a re-authentication trigger event has occurred (decision step 330). If, in one case, no re-authentication trigger event has occurred, the user 102 may continue to use the application(s) 106 without interruption. If, however a re-authentication trigger event has occurred, the user activity can be interrupted and the user may be presented with a login screen (step 304) for the identification server 108.

Figure 4:
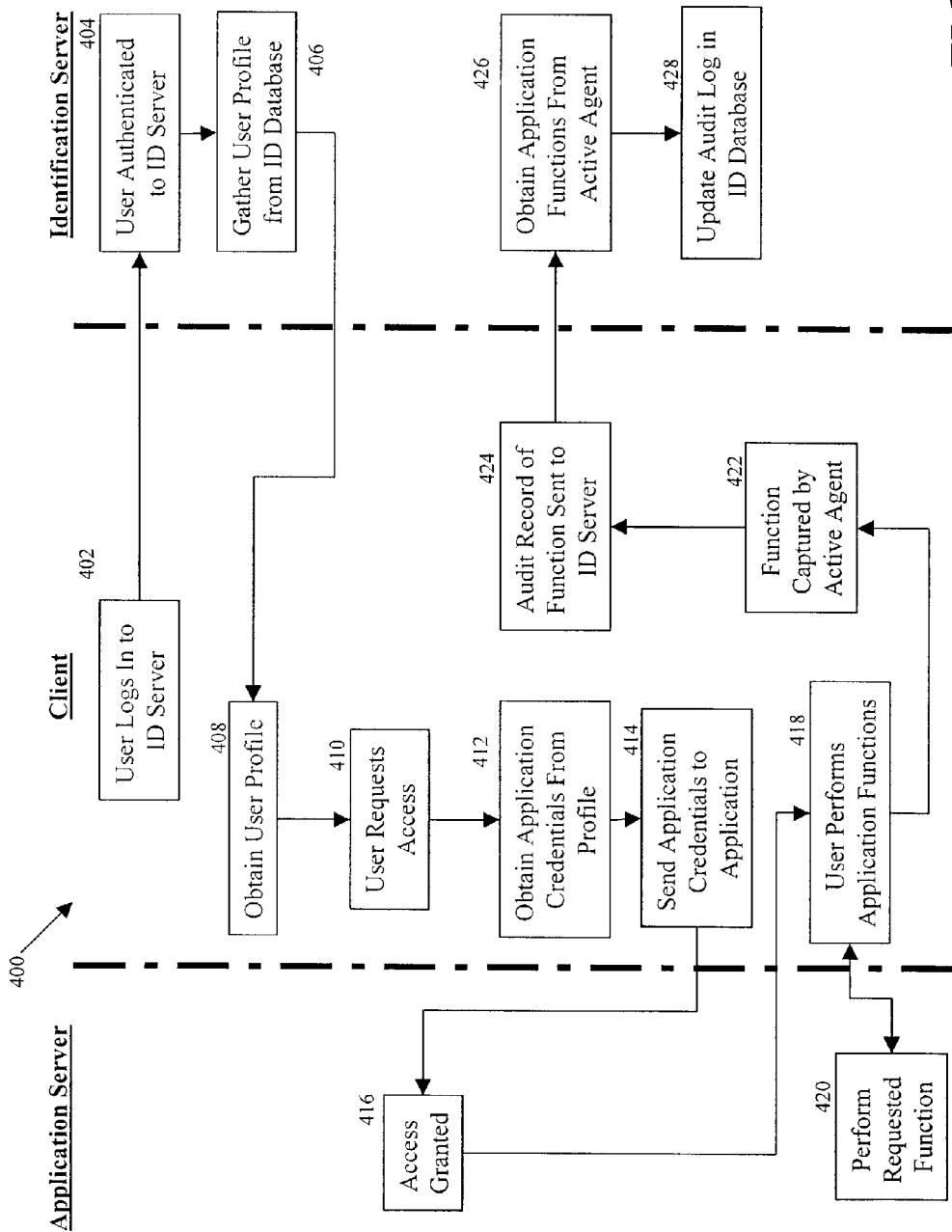
FIG. 4 is a flow diagram of a process to audit user activities within one or more applications using a client-resident profile and an identification server in accordance with the invention.

FIG. 4 illustrates yet another feature of the invention that facilitates the capturing of some or all of a user activities (or particular specified activities) within one or more applications, and the recording of the activities in audit records, which may be stored on the identification server 108, in the user profile 134, or both. As discussed above, the user of an application requests access to the application by navigating to a login page for the identification server (step 402). The user is authenticated (step 404) to the identification server 108, the user profile 134 for that user is retrieved (step 406) from the identification database module 124, sent to the client 104, and obtained (step 408) by the active agent 132. A user 102 may now request access (step 410) to one or more applications 106 via the identification server 108, according to the process described above and illustrated in FIG. 2.

As described above, the active agent 132 obtains the application credentials (step 412) from the user profile 134, completes the login form or access screen, and transmits (step 414) the credentials to the application server 106. The application server 106 then grants the user 102 access to the application (step 416), and the user 102 may then perform various functions (step 418) within the applications which are completed (step 420) by the application server 106. During this process, the active agent 132 can capture, on a continual, predefined, random or some other periodic basis, (step 422) data relating to the functions requested or performed by the user 102.

For example, the mere fact that the user has accessed the application and the time this occurred may represent an auditable event. Thus, as previously described, the active agent 132 watches for user activities (again, as specified in the user profile 134) by monitoring message queues, HTTP requests, screens or the like, and the accessed application and the time of access may be stored as audit data in an audit log. For example, the data may initially be stored in the client 104 and periodically and/or concurrently sent to the identification server 108 for storage in the database module 124.

Specific user transactions may also represent auditable events. Data specifying these events may be stored in the user profile 134 and organized as sublistings according to the applications to which they relate. For example, suppose the user accesses his brokerage account, checks his portfolio positions, and orders a trade. Perhaps successful login to the account and the trade execution represent auditable events, but the portfolio query, as no more than status check, may not be such an event. In this case, a sublisting of auditable events pertaining specifically to the brokerage account HTTP is stored in the user profile 134 along with data enabling the active agent 132 to trap the appropriate data. For example, the user profile may specify data enabling recognition of the trading page, as well as the page fields corresponding to the desired audit data and an instruction to attach a timestamp to the data when it is transmitted. More generally, the active agent 132 monitors the user's activity in accordance with the sublistings corresponding to the current application, and extracts the audit information specified therein. For example, as noted above, the active agent 132 may send the captured data (step 424) to the identification server 108, which thereby obtains the records of the captured user activities (step 426), and may update the audit log (step 428) stored in the identification database module 124. In order to avoid repudiation, the records of captured user activities are preferably signed and time-stamped digitally with a unique session code, thereby validating the user's 134 identity.

In this way, the need to store audit data on an application-by-application, server-by-server basis is eliminated. Instead, such data can be stored on a user basis across applications, and in whatever physical location is deemed appropriate. The data may later be sorted to track the user's individual activity, or to track the activities of all users of a given application.

In the embodiments of the invention described above, the software may be configured to run on any computer or workstation such as a PC or PC-compatible machine, an Apple Macintosh, a Sun workstation, etc. In general, any device can be used as long as it is able to perform all of the functions and capabilities described herein. The particular type of computer or workstation is not central to the invention.

The identification server 108 may include a network interface continuously connected to the network 110. In a typical implementation, the network interface and the other internal components of the identification server 108 intercommunicate over a main bi-directional bus. The main sequence of instructions effectuating the functions of the invention and facilitating interaction among clients 104, servers 106 and 108, and the network 110 can reside on a mass storage device (such as a hard disk or optical storage unit) as well as in a main system memory during operation. Execution of these instructions and effectuation of the functions of the invention is accomplished by a central-processing unit ("CPU").

A group of functional modules that control the operation of CPU and effectuate the operations of the invention as described above can be located in system memory. An operating system directs the execution of low-level, basic system functions such as memory allocation, file management, and operation of mass storage devices. At a higher level, a control block implemented as a series of stored instructions, responds to client-originated queries by selecting and/or assembling, and then transmitting, appropriate data.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of tracking and storing a record of user activities on a client computer, the method comprising the steps of:
    a. authenticating the identity of the user;
    b. in response to a valid authentication, receiving, from a server and storing on the client computer, a user profile comprising a set of auditable user actions to be monitored at the client computer, the set of auditable user actions being predetermined and based on the user's identity;
    c. monitoring the set of user actions within multiple applications on the client computer;
    d. creating a user-specific audit log based on the set of auditable user actions specified in the user profile; and
    e. transmitting the audit log for storage on an external computer.

2. The method of claim 1 wherein a user profile specifying the monitored auditable user actions is stored on a server in communication with the client computer over a network.

3. The method of claim 2 wherein the authentication step further comprises:
    a. storing, on the server, a user profile comprising the monitored auditable user actions and a reference set of biometric data identifying the user;
    b. receiving, at the client computer, biometric data from the user;
    c. transmitting the received biometric data from the client computer to the server over the network; and
    d. if the received biometric data matches the reference biometric data, confirming the identity of the user and transmitting the monitored actions to the client computer.

4. The method of claim 1 wherein the auditable user actions are monitored as items are entered on the client computer by the user by means of at least one input device.

5. The method of claim 4 wherein auditable user actions are monitored based on recognition of screens displayed to the user.

6. The method of claim 5 wherein a recognized screen comprises a plurality of fields, the auditable user actions comprise entering information into at least some of the fields, and the transmitted audit log comprises at least some of the entered information.

7. A system for tracking and storing a record of user activities on a client computer, the system comprising:
    a. a user profile stored on a server, and comprising a set of auditable user actions to be monitored at the client computer, the set of monitored auditable user actions being predetermined and based on the user's identity;
    b. an active agent operating on a client computer and configured to (i) receive the user profile from the server in response to a valid authentication of the user (ii) monitor the set of user actions within multiple applications on the client computer and (iii) create a user-specific audit log based on the set of auditable user actions specified in the user profile; and
    c. a client-resident communications module for transmitting the audit log for storage on an external computer.

8. The system of claim 7 further comprising an identification server for storing the user profile and, in response to a request to access one or more of the plurality of applications, transmitting the user profile to the client via the communications module.

9. The system of claim 8 wherein the user profile stored on the identification server comprises reference biometric data identifying the user, the system further comprising a biometric input device for receiving, at the client computer, biometric data from the user for transmission, by the communications module, to an authentication server.

10. The system of claim 9 further comprising an authentication server for (i) comparing the received biometric data to reference biometric data stored on the authentication server, and (ii) if the received biometric data matches the reference biometric data, confirming the identity of the user and causing the user profile to be transmitted to the client computer.

11. The system of claim 7 wherein the active agent monitors items entered on the client computer by the user by means of at least one input device.

12. The system of claim 10 wherein the active agent monitors actions based on recognition of screens displayed to the user.

13. The system of claim 12 wherein the screens comprise a plurality of fields and wherein the active agent further monitors information entered into at least some of the fields and the transmitted audit log comprises at least some of the entered information.

14. A server system for use in connection with a client computer capable of monitoring user actions within multiple applications operating thereon and transmitting a user-specific audit log based on the user actions, the system comprising:
    a. a first server for storing a user profile comprising a set of auditable user actions to be monitored at the client computer, the set of monitored auditable user actions specified in the user profile being predetermined and based on the user's identity, and, in response to a valid authentication of the user, transmitting the user profile to the client computer; and
    b. a second server for (i) comparing received biometric data to reference biometric data stored on the second server, and (ii) if the received biometric data matches the reference biometric data, confirming the identity of the user and causing the user profile to be transmitted to the client computer.

15. A system, operable on a user's client computer connected to a computer network, for tracking and storing a record of user activities on a client computer, the system comprising:
    a. means for authenticating the user's identity;
    b. means for receiving, from a server and in response to a valid authentication, a user profile comprising a set of auditable user actions to be monitored at the client computer, the set of monitored auditable user actions being predetermined and based on the user's identity;

c. means for monitoring the set of auditable user actions within multiple applications on the client computer;
d. means for creating a user-specific audit log based on the set of auditable user actions specified in the user profile; and
e. means for transmitting the audit log for storage on an external computer.

* * * * *